(12) United States Patent
Niogi et al.

(10) Patent No.: US 8,077,937 B2
(45) Date of Patent: Dec. 13, 2011

(54) REPRODUCIBLE OBJECTIVE QUANTIFICATION METHOD TO SEGMENT WHITE MATTER STRUCTURES

(75) Inventors: Sumit Narayan Niogi, New York, NY (US); Bruce D. McCandliss, New York, NY (US)

(73) Assignee: Cornell University, Ithaca, NY (US)

( * ) Notice: Subject to any disclaimer, the term of this patent is extended or adjusted under 35 U.S.C. 154(b) by 1346 days.

(21) Appl. No.: 11/282,270

(22) Filed: Nov. 18, 2005

(65) Prior Publication Data
US 2007/0127794 A1    Jun. 7, 2007

(51) Int. Cl.
*G06K 9/00* (2006.01)
*G06K 9/34* (2006.01)

(52) U.S. Cl. .................. 382/128; 382/173

(58) Field of Classification Search .............. 382/128
See application file for complete search history.

(56) References Cited

U.S. PATENT DOCUMENTS

| | | | |
|---|---|---|---|
| 5,841,892 A * | 11/1998 | McGrath et al. | 382/141 |
| 6,366,797 B1 | 4/2002 | Fisher et al. | |
| 6,614,226 B2 * | 9/2003 | Wedeen | 324/309 |
| 6,731,782 B2 | 5/2004 | Ashton | |
| 7,020,314 B1 * | 3/2006 | Suri et al. | 382/130 |
| 7,024,027 B1 * | 4/2006 | Suri et al. | 382/130 |
| 2003/0053697 A1 * | 3/2003 | Aylward et al. | 382/203 |
| 2004/0101179 A1 * | 5/2004 | Suryanarayanan et al. | 382/128 |

OTHER PUBLICATIONS

Watts et al., Fiber Tracking using Magnetic Resonance Diffusion Tensor Imaging and its Applications to Human Brain Development, Dept. of Radiology, Psychiatry, and Neuroscience, Weill Medical College of Cornell Univ., pp. 1-30.*
Butler Hospital Memory & Aging Program; Researchers at Butler Hospital Memory & Aging using diffusion-tensor imaging (DTI) to study white matter in the brain; Website; Date Last Visited Jun. 10, 2005; 4 pages; http://www.memorydisorder.org/research/dtimri_imaging/dti.htm.
PUBMED; Automatic detection of white matter lesions in magnetic resonance brain images; Website; Date Last Visited Jul. 11, 2005; 1 page; http://www.ncbi.nlm.nih.gov/entrez/query.fcgi?cmd=Retrieve&db=PubMed&list_uids=2401131&dopt=....
Leiden University Medical Center; Neuro-Image Processing Sectin, Brain-O-Matic, A Software for White Matter Lesion Detection in Dual Images (T2 and PD), Faiza Admiraal-Behloul, Jorrit Schaap (MRI Section); Website; Date Last Visited Jul. 11, 2005; 5 pages; http://www.lumc.nl/1010/LKEBHome/english/research/Neuro/BrainOMatic/LKEB_NIP_Brainomatic.html.

(Continued)

*Primary Examiner* — David Zarka
(74) *Attorney, Agent, or Firm* — Leydig, Voit & Mayer, Ltd.

(57) ABSTRACT

The invention provides a reproducible, objective quantification technique that reliably segments white matter structures. The technique receives a seed voxel within the white matter structure from an individual, determines thresholds and selection criteria, creates a binary mask based on the at least one threshold and the at least one selection criteria and calculates the boundary of the white matter structure based on the binary mask. A magnification factor is applied to each component of the eigenvectors of voxels. Boundary voxels are determined wherein each of the boundary voxels has a magnitude above a predetermined value and is located next to a voxel having a magnitude below the predetermined value. A vector is drawn from the seed voxel to a boundary voxel and the boundary voxels are connected together, thereby forming the region of interest within the connected boundary voxels.

18 Claims, 9 Drawing Sheets

OTHER PUBLICATIONS

Fractional Segmentation of White Matter; Simon K. Warfield, Carl-Fredrik Westin, Charles R. G. Guttman, Marilyn Albert, Ferenc A. Jolesz, Ron Kikinis; Website; Date Last Visited Jun. 27, 2005; 11 pages; http://splweb.bwh.harvard.edu:8000/pages/papers/warfield/miccai99/.

Mariana Lazar, David M. Weinstein, Jay S. Tsuruda, Khader M. Hasan, Konstantinos Arfanakis, M. Elizabeth Meyerand, Benham Badie, Howard A. Rowley, Victor Haughton, Aaron Field, and Andrew L. Alexander; White Matter Tractography Using Diffusion Tensor Deflection; Human Brain Mapping 18:306-321 (2003) © 2003 Wiley-Liss, Inc.; 16 pages.

Faguo Yang, Tianzi Jiang, Wanlin Zhu, and Frithjof Kruggel; White Matter Lesion Segmentation from Volumetric MR Images; International Workshop in Medical Imaging and Augmented Reaility; Aug. 19-20, 2004; 8 pages.

Pierre Fillard, John Gilmore, Joseph Piven, Weili Lin, Guido Gerig; Quantitative Analysis of White Matter Fiber Properties along Geodesic Paths; Report; In Medical Image Computing and Computer-Assisted Intervention 2003 proceedings LNCS 2879: 16-23; Nov. 15-18, 2003; 9 pages.

Edward A. Ashton, PhD, Chihiro Takahashi, MD, Michel J. Berg, MD, Andrew Goodman, MD, Saara Totterman, MD, PhD, Sven Ekholm, MD, PhD; Accuracy and reproducibility of manual and semi-automated quantification of MS lesions in MRI; Running Title: Reproducibility of MS lesion measurement; Proceedings of SPIE MI 2002; Feb. 23, 2002; 18 pages.

Xingchang Wei, MD, Simon K. Warfield, PhD, Kelly H. Zou, PhD, Ying Wu, MD, Xiaoming Li, MD, Alexandre Guimond, PhD, John P. Mugler III, PhD, Randall R. Benson, MD, Leslie Wolfson, MD, Howard L. Weiner, MD, and Charles R. G. Guttmann, MD; Quantitative Analysis of MRI signal Abnormalities of Brain White Matter With High Reproducibility and Accuracy; Journal of Magnetic Resonance Imaging 15:203-209 (2002), DOI 10.1002/jmri.10053; © 2002 Wiley-Liss, Inc.; 7 pages.

\* cited by examiner

REPRODUCIBLE OBJECTIVE QUANTIFICATION METHOD TO SEGMENT WHITE MATTER STRUCTURES

STATEMENT REGARDING FEDERALLY SPONSORED RESEARCH AND DEVELOPMENT

This invention was made in part with Government support under Contract Number REC-0337715 awarded by the NSF (National Science Foundation). The Government may have certain rights in this invention.

FIELD OF THE INVENTION

This invention pertains to segmenting white matter structures in the brain and more particularly relates to a semi-automated process to segment white matter structures.

BACKGROUND OF THE INVENTION

Diffusion tensor magnetic resonance imaging (DTI) facilitates provides the ability to quantitatively assess white matter integrity. One area where DTI has been used has resulted in the expansion of the boundaries of diagnostic imaging by examining the diffusion of water in brain tissue. Recent studies have shown DTI can be used to provide diagnosis of disease conditions in cerebral ischemia, acute stroke, and multiple sclerosis. Its diagnostic value is based primarily on restricted water movement due to myelin found in white matter. The restricted water movement causes anisotropic diffusion. The degree of directionality of the flow is termed anisotropy, which is the coefficient of variation of the eigenvalues of the diffusion tensor. Fractional anisotropy (FA) has been implicated to being sensitive to changes in white matter integrity. FA loss and apparent diffusion coefficient ($D_{av}$) rise have been demonstrated in a number of traumatic brain injury studies. It is natural to assume that these quantitative characteristics are indicative of white matter damage in a variety of pathologies.

The quantification of DTI for investigating white matter abnormalities is generally approached using one of two methods. These methods are voxel-based analysis (VBA) where data sets are compared at a voxel by voxel scale and region of interest (ROI) analysis. In cases where it is impractical to predict anatomical domains of damage, researchers tend to use a voxel-based approach to characterize statistical differences between groups. VBA involves spatial normalization of brain images to a stereotactic 3D space. In order to produce a more normalized distribution of image data, a smoothing function is applied to the images. Statistical differences between groups are then made on a voxel by voxel basis to determine variations in tissue composition.

While a voxel based strategy has the advantage of evaluating the brain in a model-free manner, and is therefore suitable for the identification of unexpected areas of white matter pathology, there are several limitations. A central disadvantage of this approach is that differences in gross anatomical morphology among subjects may influence spatial normalization and thus artificially inflate measurement differences. Moreover, many normalization algorithms use smoothing functions which introduce "blur" into the image, and violates the original uniformity of voxel size present in the original images, thereby creating noise in the measurement. Researchers have suggested the possibility that VBA has reduced and inconsistent sensitivity in specific regions of the brain, especially those with greater anatomical variability. Furthermore, VBA is only applicable for group analyses so its clinical application for individual subject analysis has not yet been convincingly demonstrated. Most importantly, VBA is not a genuine quantitative analysis of tissue differences, but a more qualitative analysis of regional variations.

Most researchers use ROI analysis when it is possible to hypothesize specific areas of the brain that are implicated in disease. However, ROI analysis normally requires manual tracing readily identifiable regions. Current methods for obtaining these boundaries are principally manual and subjective. These methods include hand drawn ROI analysis where investigators draw polygons over one of many potential 2 dimensional MR images. Manual tracing of white matter structures in the brain also is very time consuming, requiring expert contribution to accurately identify structure boundaries. The manual tracing can take up to several hours per case. For ROI analysis, researchers identify brain regions and compare FA and $D_{av}$ between research subjects and normal controls. Selection bias and variability in the process of selecting images and drawing ROI's introduces significant barriers to both research methodology and clinical assessment. Conventional clinical analysis does not include a standardized quantitative protocol that can be applied to a variety of conditions.

From the above, it can be seen that there is a need for a rapid automated or semi-automated method for white matter quantification for both individual and group analysis.

BRIEF SUMMARY OF THE INVENTION

The invention provides a reproducible, objective quantification technique that can be used to analyze large groups of subjects reliably and segment white matter structures, and provides statistical benchmarks for assessing individual results as pathological. The technique receives an identification of an anatomical structure to analyze from an individual, determines at least one threshold and at least one selection criteria, creates a binary mask based on the at least one threshold and the at least one selection criteria and calculates the boundary of the white matter structure.

Once an anatomical structure is chosen by the user, the user selects a seed voxel within the white matter structure. The process determines the x, y, and z components of the principal eigenvector of the seed voxel, which denotes the direction of maximal diffusivity. The maximum component of the x, y, and z components of the principal eigenvector is determined. A magnification factor is applied to each of the x, y, and z components of the eigenvectors of voxels in the anatomical structure.

In one embodiment, the magnification factor is calculated from the equation $$\text{MagnificationFunction} = \frac{FA - \max(FA) * \alpha}{\max(FA) * \beta} + \gamma,$$

where FA is the fractional anisotropy, and $\alpha$, $\beta$, and $\gamma$ are constants.

The invention determines which voxels in the anatomical structure have maximum magnified x, y, or z component magnitude is greater than a predetermined value, the predetermined value being the maximum magnified factor of the x, y, or z component of the principal eigenvector subtracted by a predetermined factor (or multiplied or divided by a predetermined fraction). In one embodiment, the predetermined factor to be subtracted is 0.2. The voxels whose maximum magnified x, y, or z component magnitude is greater than the predetermined value is assigned a first value, such as way of example and not limitation, a value of one. The voxels whose maximum magnified x, y, or z component magnitude is less than the predetermined value is assigned a second value, such as way of example and not limitation, a value of zero. Boundary voxels are determined wherein each of the boundary voxels has a magnitude of the first value and is located next to a voxel having a magnitude of the second value. A vector is drawn from the seed voxel to a boundary voxel and the boundary voxels are connected together, thereby forming connected boundary voxels. The region of interest is the voxels within the connected boundary voxels.

These and other advantages of the invention, as well as additional inventive features, will become more apparent from the following detailed description when taken in conjunction with the accompanying drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE INVENTION

Figure 1:
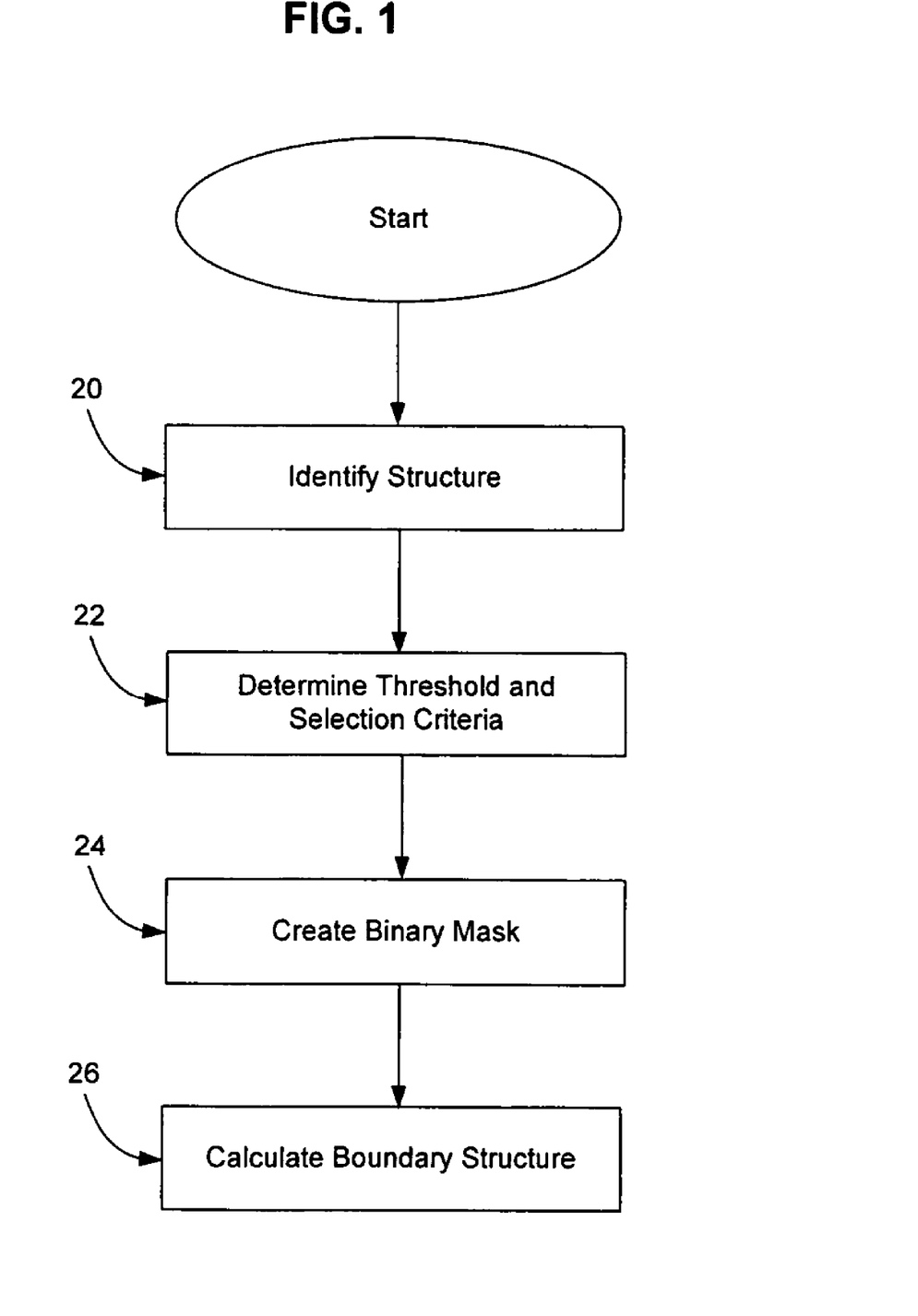
FIG. 1 is a flowchart illustrating the overall steps taken to segment white matter structures in accordance with the teachings of the invention.

The invention provides a reproducible, objective quantification technique that is essential to analyze large cohorts of subjects reliably, and provides statistical benchmarks for assessing individual results as pathological. The invention utilizes a four step process to segment white matter structures. Turning to the drawings wherein like reference numerals refer to like elements, FIG. 1 illustrates the overall steps the invention takes. These steps are manual identification of anatomical structures (step 20), determination of thresholds and selection criteria (step 22), creation of a binary mask (step 24), and calculation of the boundary of the structure (step 26).

The invention is operational with numerous general purpose or special purpose processors or computer configurations. Examples of well known processors and/or computer configurations that may be suitable for use with the invention include, but are not limited to, personal computers, server computers, hand-held or laptop devices, multiprocessor systems, microprocessor-based systems, network PCs, minicomputers, mainframe computers, peripherals (e.g., scanner, data acquisition system, video card, network interface card, etc.) and the like. Programs operating on the processor are generally stored on computer readable media. Computer readable media can be any available media that can be accessed by the processor and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the processor. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 2:
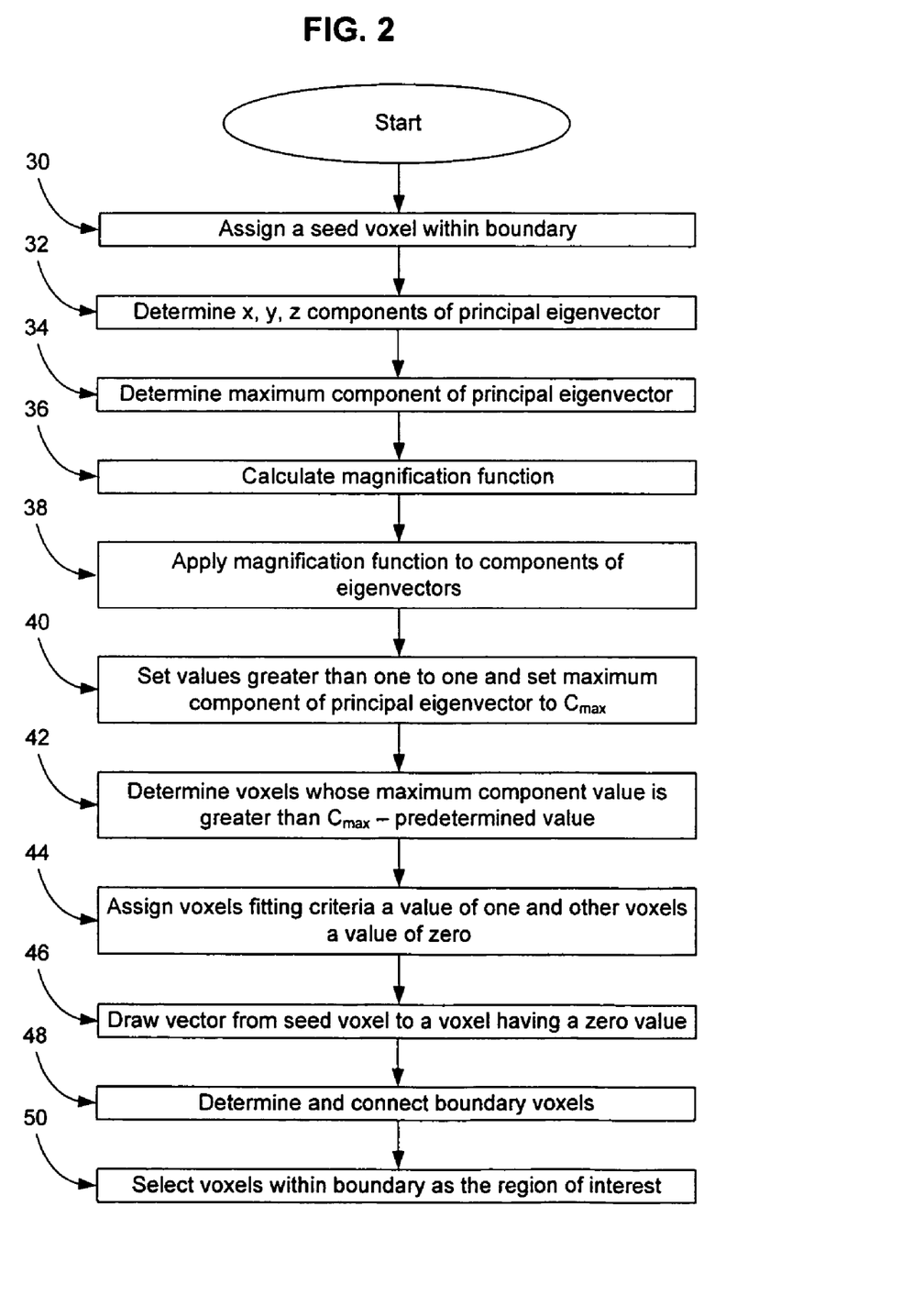
FIG. 2 is a flowchart illustrating more details of the steps of FIG. 1.

Now that the overall steps have been described, further details of the invention shall be described. Turning now to FIG. 2, the identification of anatomical structures is initially done so that the process of the invention is provided a seed voxel within the boundary of the structure. For example, fourteen structures that are readily identifiable based on a priori knowledge of neuroanatomy can be chosen for analysis. These structures are the (1) superior longitudinal fasciculus (superior to the cingulum), (2) centrum semiovale, (3) cingulum, (4) body of the corpus callosum, (5) genu of the corpus callosum, (6) splenium of the corpus callosum, (7) optic radiations, (8) arcuate fasciculus (at the level of the corpus callosum), (9) inferior longitudinal fasiculus, (10) anterior and (11) posterior limbs of the internal capsule, (12) cerebral peduncle, (13) superior cerebellar peduncle, and (14) middle cerebellar peduncle. Some of these regions were chosen because they are known to be frequently injured in head trauma, and others were chosen because they are known to be relatively spared. The first step for segmenting a structure is manually assigning a seed voxel within the boundary of the structure (step 30).

Once a seed voxel has been assigned, thresholds and selection criteria are determined for the automation of voxel selection. Based on a priori knowledge of brain anatomy and white matter tract organization, many white matter structures of the brain have their axis of greatest diffusivity oriented predominately along one of the three cardinal directions (i.e. superior-inferior, anterior-posterior, or left-right). Furthermore, the boundaries of these white matter structures are either gray matter, cerebral spinal fluid, or other white matter structures that have their axis of greatest diffusivity oriented in an orthogonal direction. With this in mind, the x, y, and z components of the principal eigenvector of the seed voxel are determined, where the principal eigenvector denotes the direction of maximal diffusivity (step 32). The maximum component (x, y, or z) of the principal eigenvector is determined (step 34). The first selection criterion is to restrict the selection to voxels with the same maximum component of the principal eigenvector as the seed voxel. A magnification function is calculated (step 36) according to the equation.

$$MagnificationFunction = \frac{FA - \max(FA) * \alpha}{\max(FA) * \beta} + \gamma \quad (1)$$

Where FA is the fractional anisotropy, $\alpha=0.3$, $\beta=0.3$, $\gamma=0.5$

Because white matter structures have high anisotropy, potential voxels that have high anisotropy can be "magnified." The constants, $\alpha$, $\beta$, and $\gamma$ are determined in an ad hoc fashion. Varying the constants allows one to adjust the weighting of high and low anisotropy voxels according to the requirements needed. The magnification function is then applied to each component of the principal eigenvector (step 38) and resultant voxel values greater than one are set to one (step 40). This step has the added benefit of helping reduce noise in the image. The value of the maximum component (x, y, or z) is labeled $C_{max}$. Voxels in the structure are restricted to those with $C_{max}$ greater than the $C_{max}$ of the seed voxel attenuated (e.g., subtracted, multiplied, divided, etc.) by a predetermined factor. In one embodiment, the predetermined factor is subtracting the $C_{max}$ by 0.2. These voxels are determined (step 42). Note that the selection of the threshold is a variable threshold dependent on the seed, as opposed to a constant value. This is used to adjust for variations in MR scanners and variations in diffusion properties in various areas of the brain. A value of 0.2 is chosen because diffusion properties within a white matter structure are slightly heterogeneous, but have a deviation by less than this amount. While a value of 0.2 is used, it is recognized that other values may be used.

Given the selection criteria stated above, a binary mask is created such that voxels that fit the previous criteria are assigned a value of one and all other voxels are assigned a value of zero (step 44).

The boundary of the structure is then determined. A vector is drawn from the seed voxel to a voxel with a value of zero (step 46). The voxel (with a value of 1) immediately preceding the zero-valued voxel is a boundary voxel. A chain-algorithm is then applied to determine and connect all boundary voxels (step 48), which are those with a value of 1, but have an adjacent zero-valued voxel. A chain-algorithm links adjacent boundary voxels together by first finding all the boundary voxels and following the boundary around in one direction, voxel by voxel, until it returns to the starting voxel. All voxels within the boundary, regardless if they have a value of 1 or 0, are then chosen as the region of interest (step 50).

Now that the invention has been described, a comparison of the processes of the invention to fully manual techniques shall be discussed to show how the invention improves the current method of determining the ROI. In the comparison, five raters of varying skill levels and knowledge of brain anatomy and neuroscience were given instructions on how to locate the corpus callosum and then asked first to use a mouse to manually draw a region of interest on 5 brains, twice. Then they were taught how to use the invention and asked to segment the corpus callosum on the same 5 brains (twice) using the method described above. All raters were told and under the belief that they were given 10 different brains to reduce any bias. Because raters simply had to select seed voxels within the corpus callosum which they clearly identified, there should not have been any practice effect favoring the method of invention. The coordinates of the ROI, average FA for the ROI, and the time to complete the exercise for both methods was recorded. Coefficient of variation (CV) of the FA for all the ROIs for each method was calculated to quantify inter-operator and intra-operator reliability.

The invention is designed to create the same boundary that a user aims to manually draw around a ROI, but without human error. To this end, an experienced operator manually drew a ROI around the corpus callosum 5 times then selected the same corpus callosum using the invention. The final hand drawn ROI had voxels that were selected every time during the 5 manual traces. Using these voxels, 3 types of voxels were classified. These are: 1) those voxels selected using manual tracing, but not by the invention; 2) those that were selected by the invention, but not by manual tracing; 3) those that were selected by both the invention and manual tracing. Voxels selected by the invention but not by manual tracing have similar diffusion properties to those selected by both the invention and manual tracing. Those voxels selected by manual tracing but not by the invention tend to fall outside the range of voxels selected by both methods.

Figure 3A:
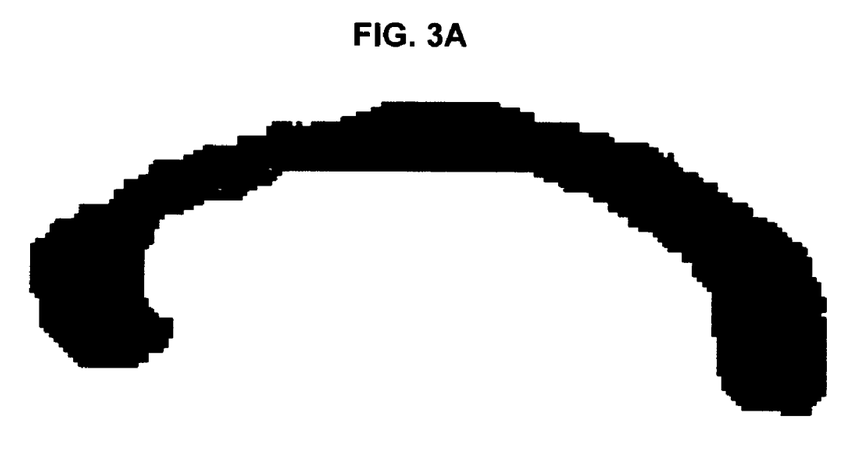
FIG. 3a is a sagittal corpus callosum region of interest drawn by 5 raters using a conventional hand-drawn technique by outlining the structure with a mouse.
Figure 3B:
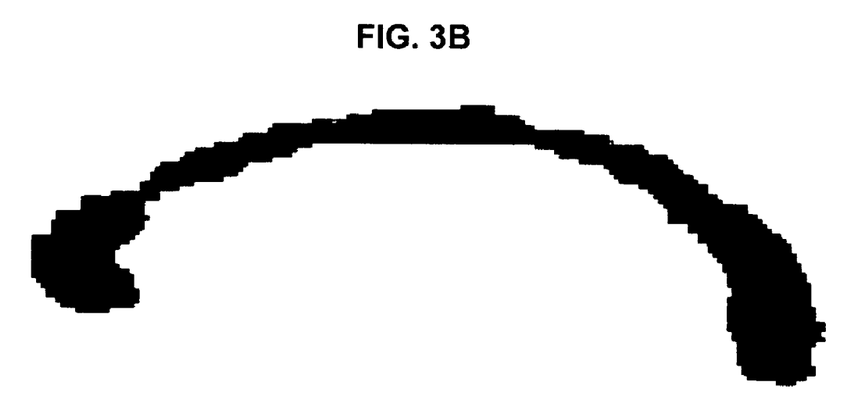
FIG. 3b is the sagittal corpus callosum region of interest of the same structure of FIG. 3a using the method of the invention.

The results of the inter-operator reliability trials described above are given in Table 1. These results show that the invention provides improved reproducibility over hand drawn ROIs. CV of inter-operator reliability for manual tracing ranged from 4.02%-8.03% over 10 trials, while CV for the invention ranged from 0.68%-1.41%, thereby demonstrating the substantially better precision (p<0.01, Wilcoxon rank sum test) of the invention. FIGS. 3a and 3b illustrates the variability of hand drawn tracing versus the precision of the invention. FIG. 3a illustrates a sagittal corpus callosum region of interest by 5 raters using a conventional hand-drawn technique by outlining the structure with a mouse. Significantly reduced inter-operator variability occurs when using the method of the invention for the same ROI as illustrated in FIG. 3b. For each rater, FA measurements were always less in hand drawn tracing than with the invention. This consistent result can be explained by the tendency of raters to overestimate the ROI by including CSF within the boundary. This tendency is discussed in greater detail in the following section.

TABLE 1

Inter-rater reliability: FA of ROI from Hand Drawn and ROQS

| | rater 1 | rater 2 | rater 3 | rater 4 | rater 5 | Mean | SD | CV |
|---|---|---|---|---|---|---|---|---|
| Brain 1a | | | | | | | | |
| HD | 0.589 | 0.654 | 0.620 | 0.648 | 0.583 | 0.619 | 0.033 | 5.253 |
| ROQS | 0.661 | 0.657 | 0.660 | 0.671 | 0.657 | 0.661 | 0.006 | 0.902 |
| Brain 1b | | | | | | | | |
| HD | 0.534 | 0.591 | 0.589 | 0.603 | 0.617 | 0.587 | 0.032 | 5.411 |
| ROQS | 0.651 | 0.670 | 0.654 | 0.663 | 0.659 | 0.659 | 0.007 | 1.098 |
| Brain 2a | | | | | | | | |
| HD | 0.623 | 0.674 | 0.617 | 0.616 | 0.659 | 0.638 | 0.027 | 4.215 |
| ROQS | 0.668 | 0.683 | 0.689 | 0.678 | 0.677 | 0.679 | 0.008 | 1.144 |
| Brain 2b | | | | | | | | |
| HD | 0.598 | 0.657 | 0.627 | 0.595 | 0.619 | 0.619 | 0.025 | 4.021 |
| ROQS | 0.667 | 0.674 | 0.688 | 0.670 | 0.675 | 0.675 | 0.008 | 1.177 |
| Brain 3a | | | | | | | | |
| HD | 0.560 | 0.621 | 0.567 | 0.653 | 0.584 | 0.597 | 0.039 | 6.597 |
| ROQS | 0.681 | 0.683 | 0.674 | 0.683 | 0.686 | 0.681 | 0.005 | 0.684 |
| Brain 3b | | | | | | | | |
| HD | 0.591 | 0.582 | 0.582 | 0.655 | 0.658 | 0.614 | 0.039 | 6.379 |
| ROQS | 0.683 | 0.690 | 0.681 | 0.675 | 0.675 | 0.681 | 0.006 | 0.905 |

TABLE 1-continued

Inter-rater reliability: FA of ROI from Hand Drawn and ROQS

|  | rater 1 | rater 2 | rater 3 | rater 4 | rater 5 | Mean | SD | CV |
|---|---|---|---|---|---|---|---|---|
| Brain 4a | | | | | | | | |
| HD | 0.621 | 0.583 | 0.634 | 0.684 | 0.652 | 0.634 | 0.037 | 5.889 |
| ROQS | 0.695 | 0.711 | 0.695 | 0.700 | 0.709 | 0.702 | 0.008 | 1.091 |
| Brain 4b | | | | | | | | |
| HD | 0.634 | 0.669 | 0.592 | 0.673 | 0.623 | 0.638 | 0.034 | 5.306 |
| ROQS | 0.701 | 0.696 | 0.684 | 0.687 | 0.689 | 0.691 | 0.007 | 1.024 |
| Brain 5a | | | | | | | | |
| HD | 0.610 | 0.603 | 0.575 | 0.694 | 0.677 | 0.632 | 0.051 | 8.080 |
| ROQS | 0.688 | 0.698 | 0.694 | 0.703 | 0.691 | 0.695 | 0.006 | 0.852 |
| Brain 5b | | | | | | | | |
| HD | 0.617 | 0.630 | 0.585 | 0.672 | 0.656 | 0.632 | 0.034 | 5.374 |
| ROQS | 0.692 | 0.707 | 0.681 | 0.698 | 0.691 | 0.694 | 0.010 | 1.403 |

Figure 4:
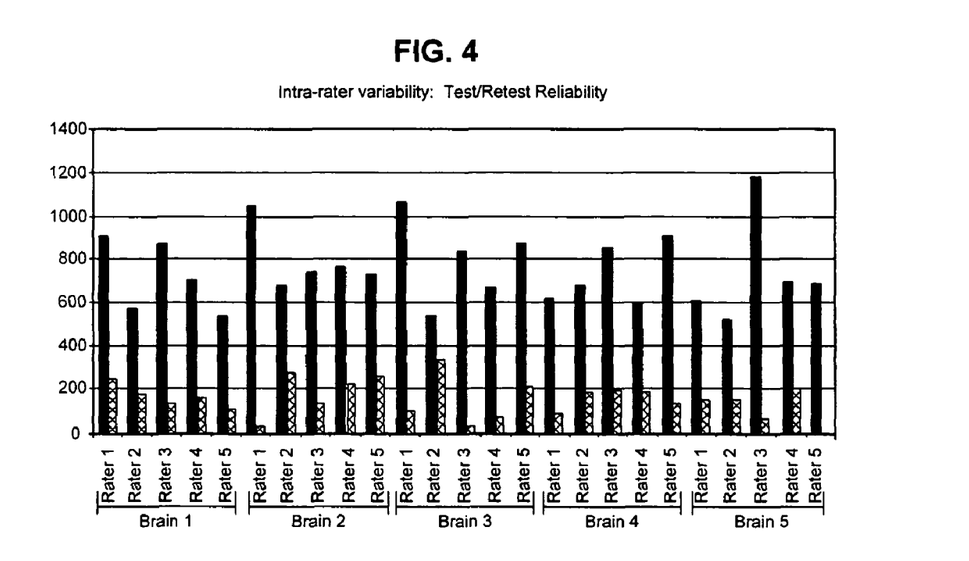
FIG. 4 is a graph illustrating the test-retest reliability using the method of the invention and manual tracing.

Intra-operator reliability was evaluated using two methods. The first intra-operator reliability test compared the number of differing voxels over two measurements for manual tracing versus tracing with the invention. As seen in FIG. 4, there is a substantial increase in test-retest reliability using the method of the invention rather than manual tracing. In FIG. 4, the solid bar graphs are the test-retest reliability of manual tracing and the patterned bar graphs are the test-retest reliability of the technique of the invention. One rater was able to choose the same exact ROI with the invention twice, which is virtually impossible with manual tracing. This experiment clearly indicates that manual tracing is less reproducible than the invention. The second intra-reliability test compared the average FA of hand drawn ROI versus the ROI drawn with the invention. CV of manual tracing ranged from 0.17% to 9.8% with an average variability of 3.55%, while variability of the method of the invention ranged from 0.0% to 2.01% with an average of 0.80% (Table 2). The CV indicates that ROQS is significantly more reliable than manual tracing ($p<0.01$, Wilcoxon signed rank test).

TABLE 2

Intra-rater reliability: Coefficient of variation of FA measurement

|  | rater 1 | rater 2 | rater 3 | rater 4 | rater 5 |
|---|---|---|---|---|---|
| Brain 1 | | | | | |
| HD | 6.938 | 7.140 | 3.563 | 5.110 | 4.010 |
| ROQS | 1.013 | 1.409 | 0.620 | 0.919 | 0.187 |
| Brain 2 | | | | | |
| HD | 2.895 | 1.844 | 1.163 | 2.446 | 4.464 |
| ROQS | 0.070 | 0.946 | 0.109 | 0.869 | 0.141 |
| Brain 3 | | | | | |
| HD | 3.930 | 4.590 | 1.865 | 0.177 | 8.422 |
| ROQS | 0.206 | 0.708 | 0.731 | 0.857 | 1.110 |
| Brain 4 | | | | | |
| HD | 1.534 | 9.808 | 4.841 | 1.082 | 3.193 |
| ROQS | 0.615 | 1.530 | 1.161 | 1.332 | 2.015 |
| Brain 5 | | | | | |
| HD | 0.839 | 3.111 | 1.219 | 2.302 | 2.172 |
| ROQS | 0.428 | 0.985 | 1.339 | 0.578 | 0.000 |

Figure 5:
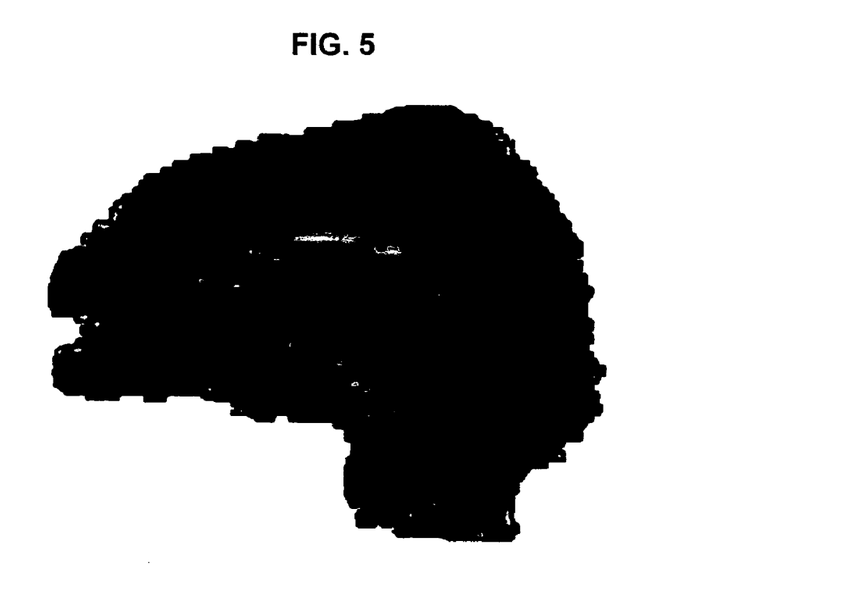
FIG. 5 shows a midline sagittal FA image of a corpus callosum illustrating voxels that were chosen by both the technique of the invention and manual tracing, voxels chosen by the invention but not manual tracing, and voxels chosen by manual tracing but not the invention.

Accuracy of the segmentation was evaluated by comparing voxels that were chosen exclusively by manual tracing and exclusively by the invention to those voxels selected by both methods as can be seen in FIG. 5. FIG. 5 shows a midline sagittal FA image of a corpus callosum. The voxels that were chosen by both the technique of the invention and manual tracing are shown in green. The voxels chosen by the invention but not manual tracing are depicted as red. The voxels chosen by manual tracing but not the invention are blue. Red voxels have similar FA to the green voxels, whereas 46% of the blue voxels are below the minimum FA of the green region. This indicates that manual tracing selects unwanted voxels that are not part of the desired structure.

Figure 6:
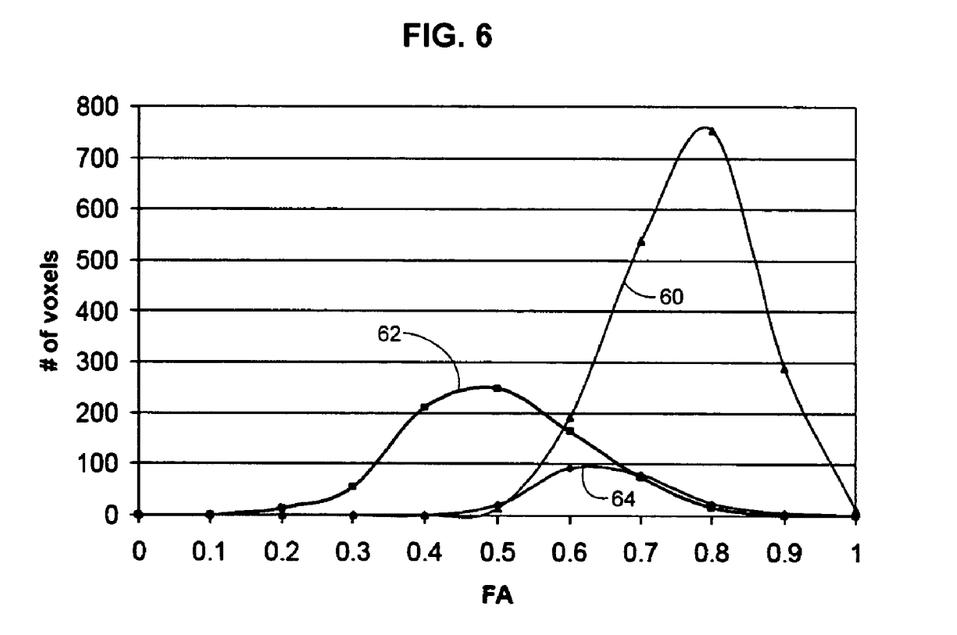
FIG. 6 shows histograms of the FA for each of the groups shown in FIG. 5.

Histograms of the FA for each of the groups shown in FIG. 5 are displayed in FIG. 6. Line 60 are voxels chosen by both hand drawn (HD) and the techniques of the invention are illustrated by line methods. Line 62 are voxels chosen by hand drawn tracing, but not by the technique of the invention. Line 64 are voxels chosen by the technique of the invention, but not by hand drawn tracing. All voxels chosen exclusively by the technique of the invention share similar FA as those chosen by both methods. Forty-six percent (46%) of the voxels chosen exclusively by hand drawn tracing are outside the range of FA found in the voxels chosen by both methods. Results demonstrate that voxels chosen by the invention, but not manual tracing, are in the same range of FA values as those voxels agreed upon by both methods, whereas 46% of voxels chosen exclusively by manual tracing lie outside the range of FA values selected by both methods. Mean and variance of FA values from the ROI of the invention also match more closely to the voxels agreed upon by both methods (See Table 3).

TABLE 3

|  | Mean | Variance |
|---|---|---|
| ROQS/HD intersection | 0.714 | 0.00750 |
| ROQS NOT HD | 0.603 | 0.00613 |
| HD NOT ROQS | 0.450 | 0.0140 |
| Entire ROQS ROI | 0.702 | .00852 |
| Entire Hand Drawn ROI | 0.634 | 0.0241 |

The invention also provides more rapid ROI delineation. Speed comparisons show an 80% decrease in time for creating an ROI using the invention compared to manual tracing.

From the above, it can be seen that the invention presents tools to accurately select ROIs based on anatomically identifiable structures. By focusing on easily identifiable structures as seed points, and algorithmically determining the boundary of this structure, this method reduces several sources of measurement error. The invention uses the principal eigenvalue from DTI to distinguish white matter from gray matter and CSF in order to segment various white matter structures. This is unlike diffusion tensor fiber tracking which often uses anisotropy as a threshold value. This segmentation algorithm uses the principal eigenvalue instead of anisotropy for a number of reasons. First, unlike anisotropy, the principal direction of diffusion can differentiate adjacent white matter tracts with different fiber orientations. Secondly, one of the measured quantities from these analyses is anisotropy. Using anisotropy as both a criterion for segmentation and a quantity for analysis is circular.

The invention is a fast, robust, and reliable technique for performing ROI analysis on DTI datasets. Compared to hand-drawn ROIs, the method of the invention has remarkably low inter-rater and intra-rater variability. Furthermore, unlike voxel-based analysis, this method does not require spatial normalization of tensor data, thereby maintaining the original equivalence across voxel dimensions present in the original data, and also avoids confounding differences in the size and shape of an individual and a template brain.

One of the most interesting results when comparing the method of the invention to hand drawn ROIs is that the FA measurement is on average higher with the invention. This can be explained on the basis of the human error that occurs with manual tracing. In an effort to encompass the entire structure, with hand drawn ROI's one often errs in selecting voxels that are outside the structure. The FA of these erroneous voxels, often cerebrospinal fluid or gray matter, is close to zero. These errors cause underestimation of the true FA for the white matter structure. The tendency to overestimate a boundary with manual tracing has been documented in other cases.

The technique of the invention, on the other hand, will not select cerebrospinal fluid or gray matter as boundary voxels as long as the user selects a seed within a white matter structure. For most cases, this is a strength of the invention, but, in some cases, it can also become a limitation. If a lesion or abnormality is on a boundary of a white matter structure, depending on the tissue properties, it is possible that the invention may dismiss these voxels in the ROI because it has sufficiently low eigenvalues. On the other hand, if a lesion or abnormality occurs within a white matter structure, the invention will include it in the ROI because it selects all voxels within the calculated boundary as part of the ROI.

Accuracy of segmentation is difficult to quantitatively assess because there is no gold standard available for comparison. For accuracy assessment, we separated voxels that were selected 100% of the time during 5 manual traces. This ROI represents those voxels that are most likely to be selected by a manual trace. We then took the intersection of the ROI derived by the invention with the hand drawn ROI. These voxels are those that both methods agree should be part of the structure. On comparing these voxels to the hand drawn ROI and the ROI derived by the invention, we can see that the ROI drawn by the invention is more conservative than the hand drawn ROI. While fewer voxels are chosen, the properties of these voxels share the same statistical properties of the voxels agreed upon by both methods. As stated previously, the manual trace may be larger because of the tendency for users to overestimate the boundary in order to encompass the entire structure. The manual trace contains several voxels that have low FA that fall outside of the FA range of the voxels agreed upon by both methods. These low FA voxels chosen by manual tracing are likely to be CSF or gray matter and were chosen because of human error.

The invention is designed to create the same boundary that a user aims to manually draw around a ROI. Because the invention is semi-automated, the user has the ability to quickly sample and/or combine a number of different seed voxels until the boundary calculated that is the same ROI the user would have drawn manually. Because the time between selecting a seed voxel and the calculation of the boundary is nearly instantaneous, a number of potential seed voxels can be sampled while maintaining speed and ease of use.

Figure 7A:
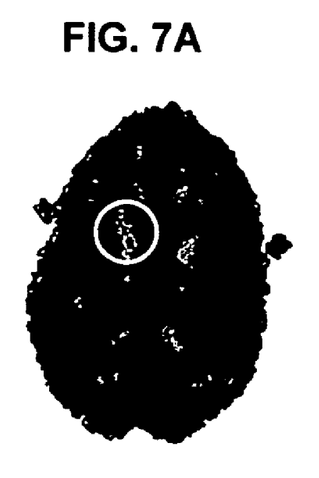
FIGS. 7a-7p illustrate how the invention segments various structures in the brain in accordance with the teachings of the invention.
Figure 7B:
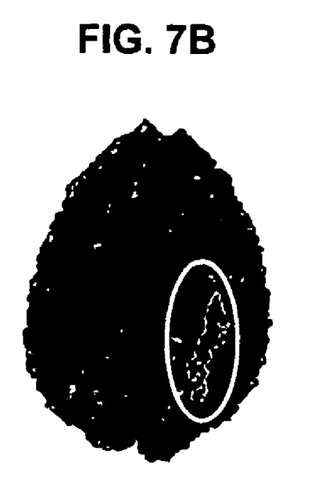
Figure 7C:
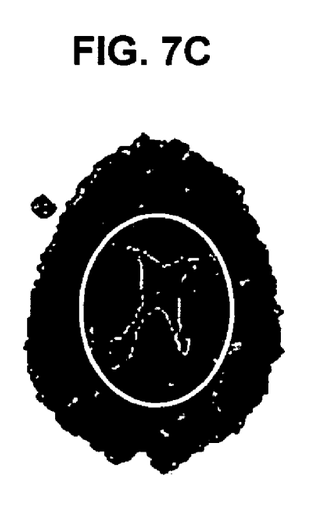
Figure 7D:
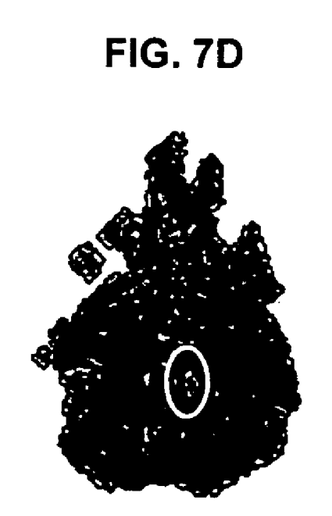
Figure 7E:
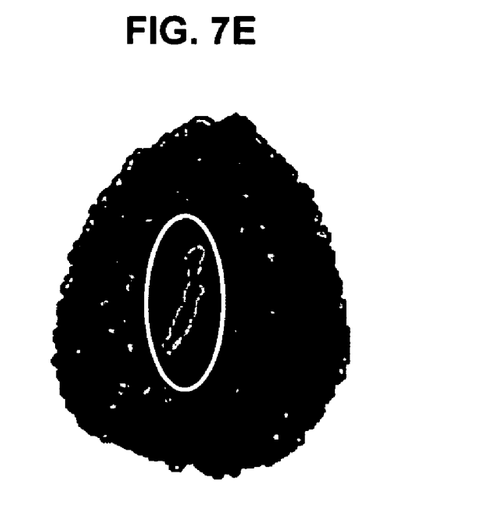
Figure 7F:
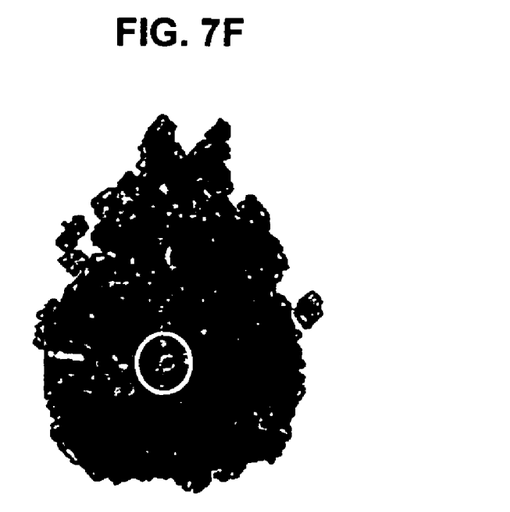
Figure 7G:
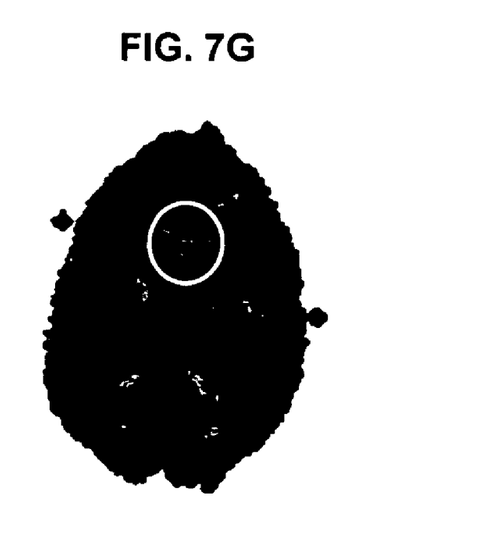
Figure 7H:
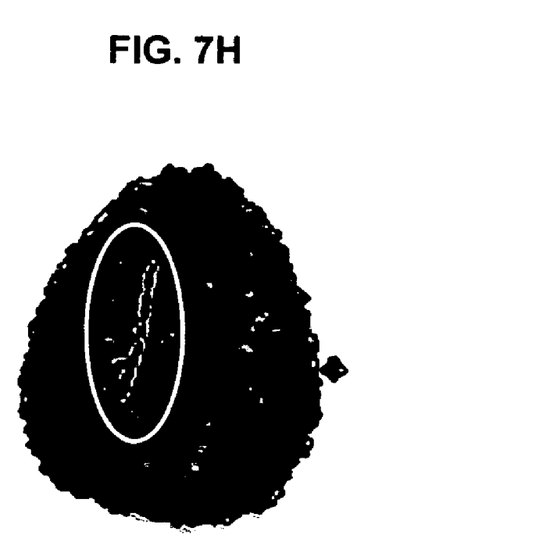
Figure 7I:
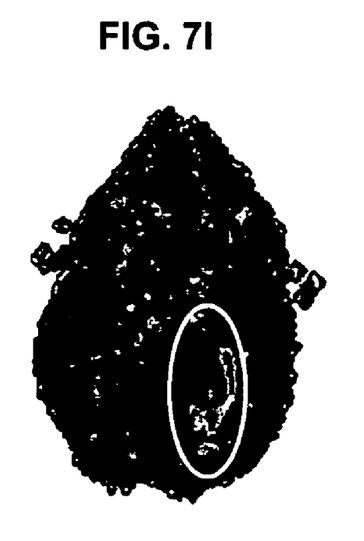
Figure 7J:
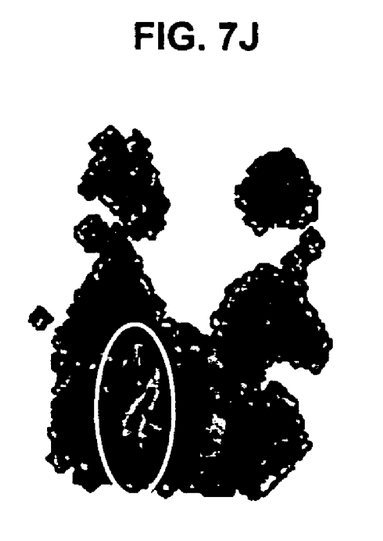
Figure 7K:
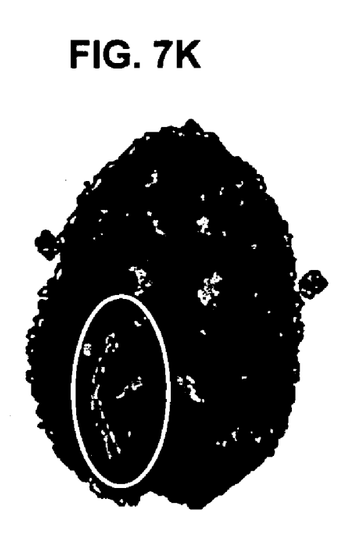
Figure 7L:
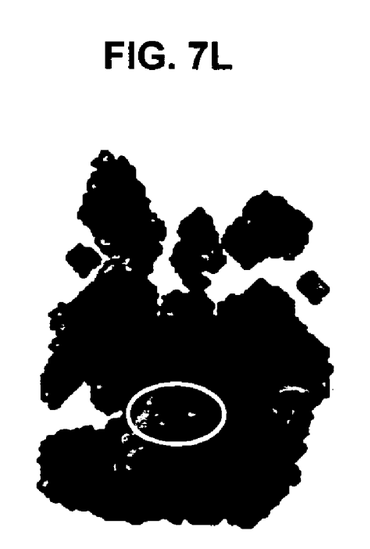
Figure 7M:
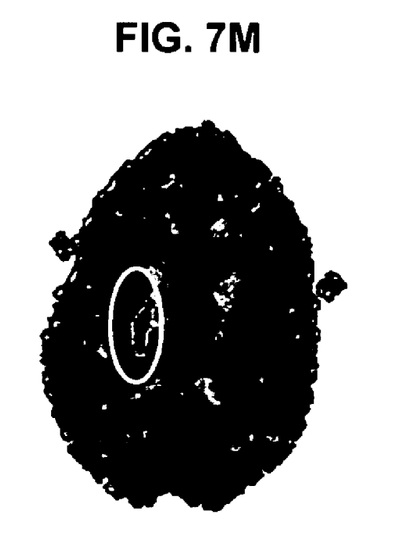
Figure 7N:
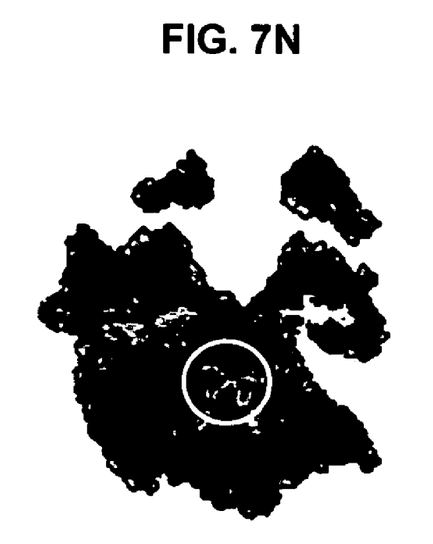
Figure 7O:
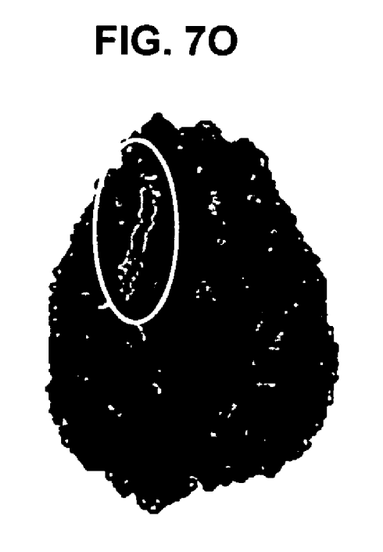
Figure 7P:
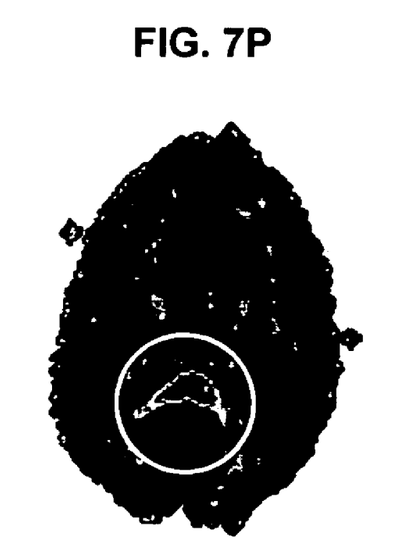

The robustness of the invention is demonstrated by the fact that several structures can be traced with minimal effort and in a reasonable amount of time consisting of simply the identification of structures which can be guided by a DTI white matter atlas. For example, FIGS. 7*a*-7*p* illustrate how the invention segments various structures in the brain displayed on axial directionally encoded color FA images. In FIGS. 7*a*-7*p*, the regions of interest are shown in white within each white ellipse. FIG. 7*a* shows the anterior lim of internal capsule. FIG. 7*b* shows the arcuaate fasciculus. FIG. 7*c* shows the body of the corpus callosum. FIG. 7*d* shows the cerebral peduncle. FIG. 7*e* shows the cingulum. FIG. 7*f* shows the decussation of superior cerebellar peduncle. FIG. 7*g* shows the genu of corpus callosum. FIG. 7*h* shows the high centrum semiovale. FIG. 7*i* shows the optic radiations. FIG. 7*j* shows the middle cerebellar peduncle. FIG. 7*k* shows the inferior longitudinal fasciculus. FIG. 7l shows the pontine crossing tract. FIG. 7*m* shows the posterior limb of internal capsule. FIG. 7*n* shows the superior cerebellar peduncle. FIG. 7*o* shows the superior longitudinal fasciculus. FIG. 7*p* shows the splenium of corpus callosum.

Figure 8:
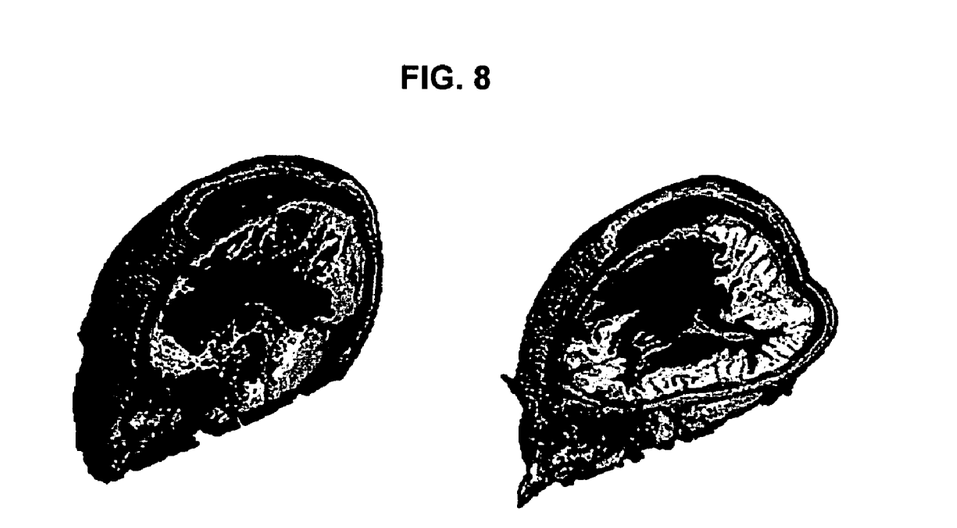
FIG. 8 is a figure illustrating the results of a 3D segmentation of the corpus callosum and corticospinal tract using the techniques of the invention.

The technique of the invention can be extended to 3 dimensions in order for 3D segmentation of white matter structures. This is done by allowing the boundary defining step of the invention (step 48) to continue in three dimensions. FIG. 8 demonstrates this extension of the invention. On the left of FIG. 8 is a 3D segmentation of the corpus callosum using the techniques of the invention. On the right is a 3D segmentation using the techniques of the invention of white matter that has diffusion in the superior-inferior direction which includes the corticospinal tract.

Errors in the approach of the invention are due to the intrinsic limitations of DTI. These are noise effects, magnetic susceptibility effects, and partial volume effects. The advent of parallel imaging in conjunction with higher field strength magnets and better gradients ameliorate a number of these limitations. The technique of the invention demonstrates great potential when used with these technical advances in DTI.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for segmenting a white matter structure comprising:

receiving by a digital processor an identification of an anatomical structure to analyze, the anatomical structure including a plurality of voxels, each of the plurality of voxels having a principal eigenvector comprising x, y, and z components, wherein the principal eigenvector denotes the direction of maximal diffusivity;

receiving a seed voxel within the anatomical structure;

determining x, y, and z components of a principal eigenvector of the seed voxel;

applying by the digital processor a magnification factor to the x, y, and z components of the principal eigenvector of a plurality of potential boundary voxels such that each potential boundary voxel is weighted based on the anisotropy of the voxel; and determining a boundary of the anatomical structure based on comparisons of a maximum component of the principal eigenvector of the seed voxel to maximum components of the principal eigenvectors of the potential boundary voxels.

2. The method of claim 1 further comprising creating a binary mask based on the comparisons of the maximum component of the principal eigenvector of the seed voxel to the maximum components of the principal eigenvectors potential boundary voxels.

3. The method of claim 1 wherein the magnification factor is calculated from the equation $$MagnificationFunction = \frac{FA - \max(\overline{F}A) * \alpha}{\max(FA) * \beta} + \gamma,$$

where FA is the fractional anisotropy, and $\alpha$, $\beta$, and $\gamma$ are constants.

4. The method of claim 3 wherein $\alpha=0.3$, $\beta=0.3$, and $\gamma=0.5$.

5. The method of claim 1 further comprising assigning a value of one to magnified potential boundary voxel components having values that are greater than one.

6. The method of claim 1, wherein the comparisons of a maximum component of the principal eigenvector of the seed voxel to maximum components of the principal eigenvectors of the potential boundary voxels further comprise comparisons of the maximum component of the principal eigenvector of the seed voxel attenuated by a predetermined factor to the maximum components of the principal eigenvectors of the potential boundary voxels.

7. The method of claim 6 wherein the predetermined factor is subtraction of 0.2.

8. The method of claim 6, wherein determining a boundary of the anatomical structure further comprises:

assigning potential boundary voxels with a maximum component of the principal eigenvector greater than the maximum component of the principal eigenvector of the seed voxel attenuated by the predetermined factor a first value; and assigning potential boundary voxels with a maximum component of the principal eigenvector not greater than the maximum component of the principal eigenvector of the seed voxel attenuated by the predetermined factor a second value.

9. The method of claim 8, wherein determining a boundary of the anatomical structure further comprises:

selecting boundary voxels, wherein the boundary voxels are potential boundary voxels having the first value that are adjacent to a potential boundary voxel having the second value; and connecting the boundary voxels together, thereby forming connected boundary voxels.

10. The method of claim 9 further comprising setting the voxels within the boundary of the connected boundary voxels as the region of interest.

11. A non-transient computer-readable medium having computer executable instructions for instructing a digital processor to perform segmentations on a white matter structure in an anatomical structure, the tangible computer-readable medium comprising:

instructions for receiving an identification of the anatomical structure to analyze, the anatomical structure including a plurality of voxels, each of the plurality of voxels having a principal eigenvector comprising x, y, and z components, wherein the principal eigenvector denotes the direction of maximal diffusivity;

instructions for receiving a seed voxel within the anatomical structure;

instructions for determining x, y, and z components of a principal eigenvector of the seed voxel;

instructions for processing the voxels of the anatomical structure by applying a magnification factor to the x, y, and z components of the principal eigenvectors of a plurality of potential boundary voxels such that each voxel is weighted based on the anisotropy of the voxel; and instructions for determining a boundary of the anatomical structure based on comparisons of a maximum component of the principal eigenvector of the seed voxel to maximum components of the principal eigenvectors of the potential boundary voxels.

12. The computer-readable medium of claim 11 wherein the magnification factor is calculated from the equation $$MagnificationFunction = \frac{FA - \max(\overline{F}A) * \alpha}{\max(FA) * \beta} + \gamma,$$

where FA is the fractional anisotropy, and $\alpha$, $\beta$, and $\gamma$ are constants.

13. The computer-readable medium of claim 11, wherein the comparisons of a maximum component of the principal eigenvector of the seed voxel to maximum components of the principal eigenvectors of the potential boundary voxels further comprise comparisons of the maximum component of the principal eigenvector of the seed voxel attenuated by a predetermined factor to the maximum components of the principal eigenvectors of the potential boundary voxels.

14. The computer-readable medium of claim 13 wherein the predetermined factor is subtraction of 0.2.

15. The computer-readable medium of claim 13, wherein the instructions for determining a boundary of the anatomical structure further comprise:

instructions for assigning potential boundary voxels with a maximum component of the principal eigenvector greater than the maximum component of the principal eigenvector of the seed voxel attenuated by the predetermined factor a first value; and instructions for assigning potential boundary voxels with a maximum component of the principal eigenvector not greater than the maximum component of the principal eigenvector of the seed voxel attenuated by the predetermined factor a second value.

16. The computer-readable medium of claim 15, wherein the instructions for determining a boundary of the anatomical structure further comprise instructions for selecting boundary voxels, wherein the boundary voxels are potential boundary voxels having the first value that are adjacent to a potential boundary voxel having the second value.

17. The computer-readable medium of claim 16, wherein the instructions for determining a boundary of the anatomical structure further comprise:

instructions for drawing a vector from the seed voxel to a boundary voxel; and instructions for connecting the boundary voxels together, thereby forming connected boundary voxels.

18. The computer-readable medium of claim 17 further comprising instructions for setting the voxels within the boundary of the connected boundary voxels as the region of interest.

* * * * *